(12) United States Patent
Ragland et al.

(10) Patent No.: US 9,316,430 B2
(45) Date of Patent: Apr. 19, 2016

(54) THERMAL INSULATING MATERIAL

(71) Applicant: Fairlane Industries, Inc., St. Louis, MO (US)

(72) Inventors: Raymond E. Ragland, St. Peters, MO (US); Kevin W. Malick, Winfield, MO (US)

(73) Assignee: Fairlane Industries Inc., St. Louis, MO (US)

(*) Notice: Subject to any disclaimer, the term of this patent is extended or adjusted under 35 U.S.C. 154(b) by 11 days.

(21) Appl. No.: 14/151,287

(22) Filed: Jan. 9, 2014

(65) Prior Publication Data

US 2014/0199537 A1 Jul. 17, 2014

Related U.S. Application Data

(60) Provisional application No. 61/764,221, filed on Feb. 13, 2013, provisional application No. 61/752,323, filed on Jan. 14, 2013.

(51) Int. Cl.
| | |
|---|---|
| *B32B 27/40* | (2006.01) |
| *B32B 27/32* | (2006.01) |
| *B29C 65/00* | (2006.01) |
| *A47B 96/04* | (2006.01) |
| *F25D 23/08* | (2006.01) |
| *F25D 23/06* | (2006.01) |
| *B32B 5/18* | (2006.01) |
| *B32B 15/04* | (2006.01) |
| *B32B 15/20* | (2006.01) |

(52) U.S. Cl.
CPC . *F25D 23/08* (2013.01); *B32B 5/18* (2013.01); *B32B 15/046* (2013.01); *B32B 15/20* (2013.01); *F25D 23/06* (2013.01); *B32B 2266/025* (2013.01); *Y10T 156/10* (2015.01)

(58) Field of Classification Search
None
See application file for complete search history.

(56) References Cited

U.S. PATENT DOCUMENTS

| | | | |
|---|---|---|---|
| 1,712,965 A | 5/1929 | Maranville | |
| 2,780,845 A * | 2/1957 | Chapman | F25D 23/02 49/490.1 |
| 3,009,601 A | 11/1961 | Matsch | |
| 3,133,422 A | 5/1964 | Paivanas | |
| 3,145,515 A | 8/1964 | Clapsalle | |
| 3,194,023 A * | 7/1965 | Sudmeier | 62/3.62 |
| 3,411,967 A | 11/1968 | Rowland | |
| 3,437,536 A | 4/1969 | Vincent | |
| 3,814,659 A | 6/1974 | Nadeau | |
| 4,073,998 A | 2/1978 | O'Connor | |
| 4,405,076 A | 9/1983 | Lines | |
| 5,082,335 A * | 1/1992 | Cur et al. | 312/401 |
| 5,100,725 A | 3/1992 | Pearson | |
| 5,316,835 A | 5/1994 | Groft | |
| 5,730,516 A * | 3/1998 | Vismara | 312/406 |
| 6,062,287 A * | 5/2000 | Ernest | 156/542 |
| 6,093,481 A | 7/2000 | Lynn | |

(Continued)

*Primary Examiner* — David Sample
*Assistant Examiner* — Nicole T Gugliotta
(74) *Attorney, Agent, or Firm* — CreatiVenture Law; Linda L. Lewis

(57) ABSTRACT

A thermal insulating material that is superior to blown-in polyurethane foam that has vertical insulating properties and lateral thermal conducting properties, and is made of alternating layers of aluminum metal foil and insulating foam that causes the temperature of a cold spot to increase at least 3 degrees F. when compared to an equivalent amount of blown-in polyurethane foam. This material is suitable for increasing the temperature of cold spots of the exterior of refrigerator/freezer doors.

12 Claims, 7 Drawing Sheets

(56) References Cited

U.S. PATENT DOCUMENTS

| | | |
|---|---|---|
| 6,276,044 B1 * | 8/2001 | Ragland et al. ................ 29/521 |
| 6,455,148 B1 | 9/2002 | Spears |
| 6,716,520 B2 | 4/2004 | Cook |
| 7,056,575 B2 | 6/2006 | Aenestad |
| 7,585,559 B2 | 9/2009 | Schroeder |
| 2004/0048049 A1 * | 3/2004 | Merrill et al. ................ 428/209 |
| 2005/0266217 A1 | 12/2005 | Cohen |
| 2009/0038334 A1 * | 2/2009 | Konig ............................ 62/430 |
| 2009/0313930 A1 | 12/2009 | Anderson |
| 2010/0018983 A1 | 1/2010 | Roberts |

* cited by examiner

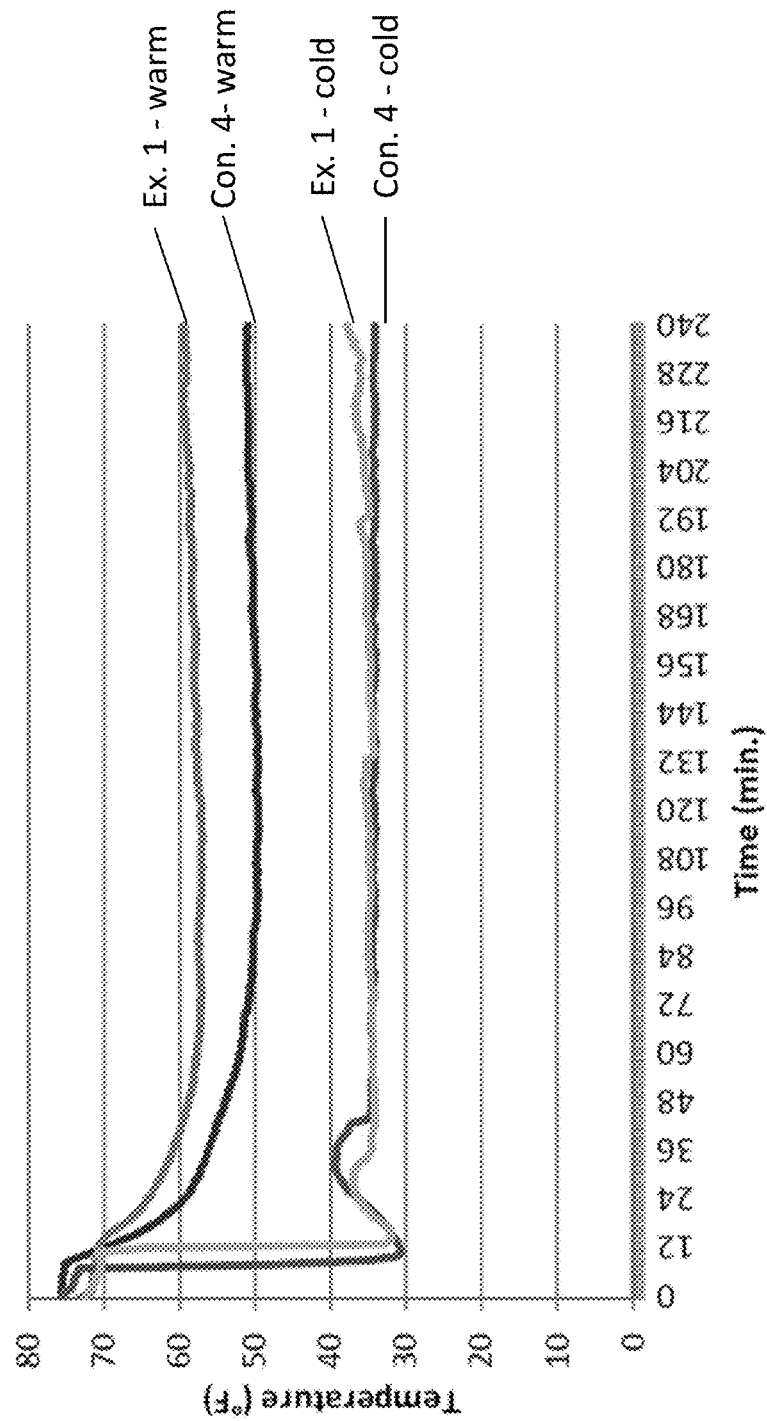

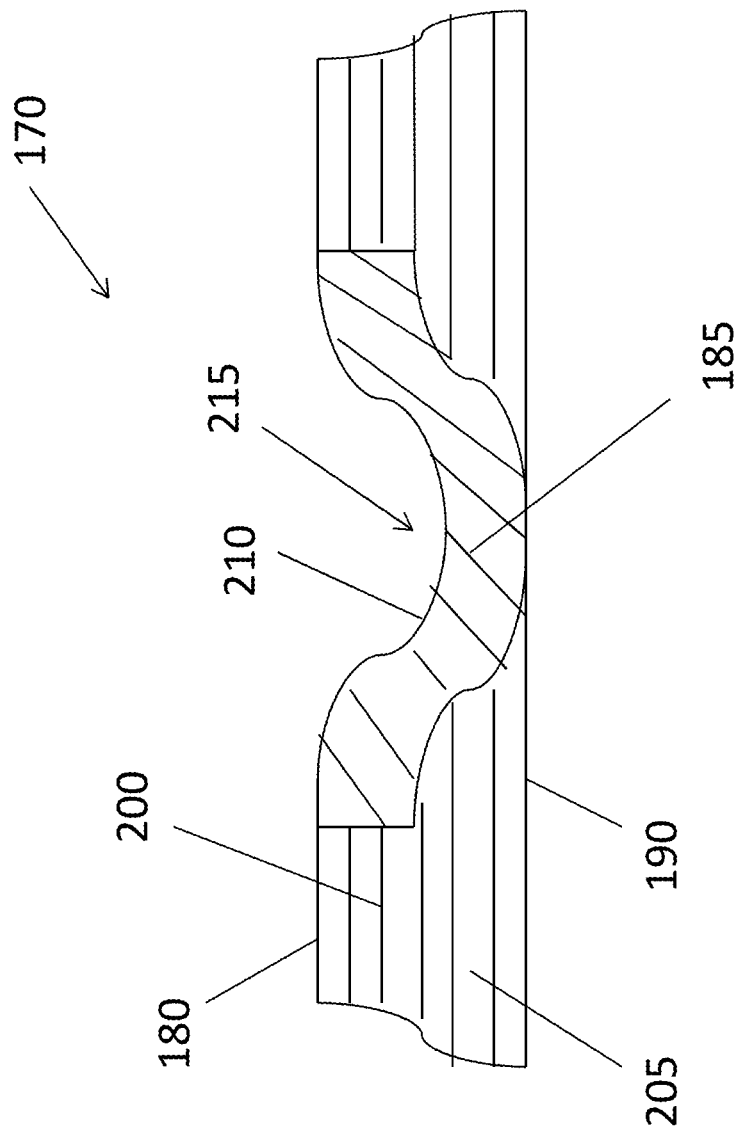

THERMAL INSULATING MATERIAL

CROSS-REFERENCE TO RELATED APPLICATIONS

This utility patent application claims the benefit of provisional patent application No. 61/764,221 filed Feb. 13, 2013 and provisional patent application No. 61/752,323 filed Jan. 14, 2013, which are hereby incorporated by reference.

STATEMENT REGARDING FEDERALLY SPONSORED RESEARCH

Not Applicable.

APPENDIX

Not Applicable.

BACKGROUND OF THE INVENTION

1. Field of the Invention

The present invention relates to a method of preventing the sweating (condensation of water vapor) of the exterior panel of a freezer or refrigerator door or wall due to cold spots, particularly at the recess behind the handle where the insulation is typically thinner than the rest of the door. The typical thermal insulating material for refrigerators or freezers is blown-in polyurethane foam in the wall panel. An improved insulating material having vertical insulating properties and lateral thermal conducting properties has been found to prevent or diminish sweating. More particularly, a thermal insulating material made of alternating layers of aluminum metal foil and formed insulating foam sheets is effective in preventing sweating. This insulating material raises the temperature of a cold spot at least 3 degrees F. when compared to an equivalent amount of blown-in polyurethane foam under defined test conditions. A cold spot is an area of a surface that is at least 3 degrees F. colder than the surrounding surface.

2. Related Art

A long standing problem with freezers is condensation or sweating on the external surface of the freezer door which results from the external surface being at a temperature below the dew point temperature of the external air contacting it. The low temperature of the external surface of a door is a result of the transfer of thermal energy from the door to the interior air of the freezer. The resulting cold spot causes moisture in the external air to condense on the colder outer surfaces of the door, particularly on a recess behind the freezer handle. It also can occur on the external peripheral edges or walls of the door, particularly those proximate to gaskets.

For a number of years this problem has been addressed by applying additional heat to the areas likely to be affected by condensation. In some refrigerators and freezers this is accomplished by an elongated electric heater positioned adjacent the inside of the front face of the door. In other refrigerators a hot gas loop is positioned inside the front face of the cabinet.

This approach has a number of drawbacks. It requires substantial additional material and labor to install a heater. The source of heat is buried in the foamed insulation and is not accessible after the manufacture of the refrigerator is completed. A hot gas loop complicates the refrigeration system and provides a potential source for a system failure. Electric heaters may not have an expected life as long as that of the refrigerator. Thus manufacturers often install two heaters, with the second to be used only if the first becomes inoperable. This increases the cost of all such refrigerators when only a small percentage of the second heaters will ever be needed. This approach makes the refrigerator less energy efficient as it requires additional energy to supply the heat and additional energy for the refrigeration system to overcome the additional thermal energy that enters the compartments.

U.S. Pat. No. 3,041,679 discloses an insulated refrigerator and freezer door. The door has a shell inside the refrigerator, with an equalizer sheet of a heat conductive metal attached to an external ornamental panel. Between the shell and equalizer sheet is an air space which prevents direct contact between the shell and the equalizer sheet. This approach teaches away from the claimed invention as it is not used in conjunction with insulation that is not air, nor does this approach provide the necessary combination of vertical insulation with thermal conductivity of the present invention.

U.S. Pat. No. 5,725,294 discloses a refrigerator door with an inner panel and an outer panel forming a chamber. On the outside of the outer panel are cold spots that result in condensation. Adhered to the outer panel, in the chamber, is a sheet or strip of metal of high heat conductivity, such as aluminum or copper, which is from about 0.005 to 0.05 inches thick. The sheet or strip extends from the cold spot to adjacent areas of the door that have a temperature above the dew point temperature. The warmer adjacent areas conduct heat via the metal strip and raise the temperature of the cooler area above the dew point temperature so that condensation is eliminated. Blown in foam insulation is added behind the metal strip, filling the chamber. This cold spot insulation of '294 teaches away from the claimed invention which combines layers of insulation providing vertical insulation with layers of aluminum foil which provides thermal conductivity. Further, the '294 insulation uses thicker foil of from 0.005 to 0.05 inches (5 to 50 mil) and is designed to be used with blown in foam insulation. The present insulation is used in place of blown in foamed insulation. Finally, the use of thermal conducting material as described in '294 fails to provide the needed combination of vertical insulation and thermal conductivity provided by the present invention.

Neither of the above disclosed insulated refrigerator doors were commercially used, because neither was highly effective in preventing sweating. Neither of the above references teaches nor suggests the claimed invention.

SUMMARY OF THE INVENTION

The present invention relates to insulating the door of a freezer or refrigeration with insulating material that is thin, flexible and highly effective. The insulating material has vertical thermal insulation properties and lateral thermal conducting properties. The material is made of alternating layers of aluminum foil and formed insulating foam sheet material. This material is superior to blown-in polyurethane foam, and can be used to increase the temperature of a cold spot when compared with an equivalent amount of blown-in polyurethane foam by at least 3 degrees F. It is a suitable replacement for an in-panel electric heater having up to 39 parts.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 6 is a graphical representation of the results of the data generated with the test apparatus.

FIG. 7 is a cut-away perspective of a refrigerator door with a recess under the handle.

DETAILED DESCRIPTION OF THE PREFERRED EMBODIMENTS

Figure 1:
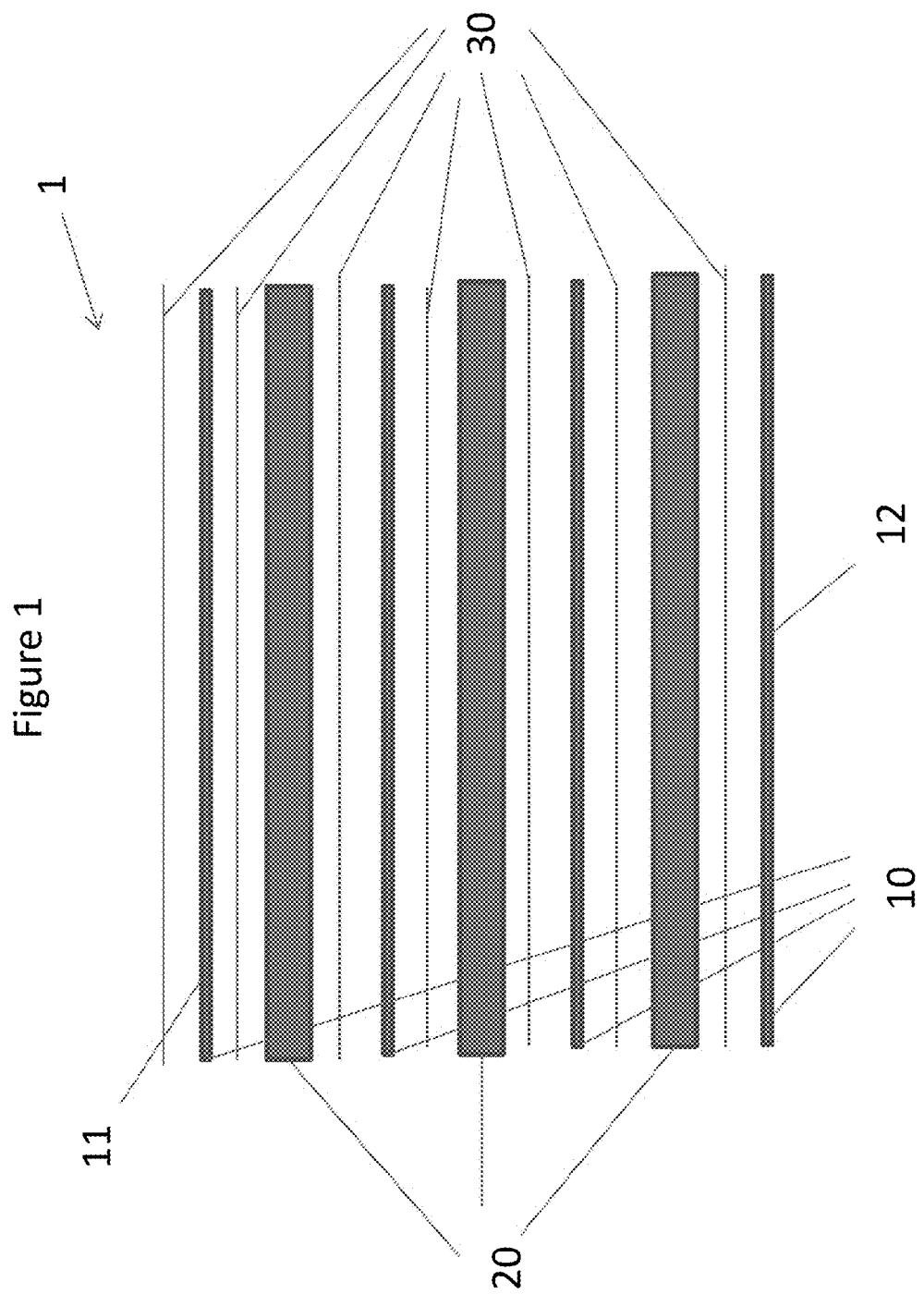
FIG. 1 is a cut-away view of an embodiment of the present invention tested as Example 1.

The following description of the preferred embodiment(s) is merely exemplary in nature and is in no way intended to limit the invention, its application, or uses.

The present invention is directed to a thermal insulating material suitable for insulating freezers, refrigerators, electronic devices, etc. The insulating material has dual properties. The material has thermal vertical insulating properties, so that a temperature differential between the top and the bottom of the insulting material is approximately maintained by the insulating materials. Heat does not easily travel vertically through the insulation. Additionally, the material of the present invention has lateral thermal conductivity. This means that a cold spot on the surface of the insulating material will approximately equalize with the lateral (surrounding) non-cold surface. Heat travels laterally toward the cold spot, thereby increasing the temperature of the cold spot.

Of particular interest is the use of the present invention in the insulation in the compartment in refrigerator or freezer doors, as is shown in FIG. 7. The door 170 has an exterior panel 180 and an interior panel 190, with insulation in the chamber 200 between the panels. Typically polyurethane foam 205 is blown into the door chamber 200 to provide insulation: the interior cold is maintained in the refrigerator or freezer, and the external heat is kept out. In some metal doors, there is a recess 210 for the grip of a handle, so the fingers of the user can grip the handle and open the door. Behind this recess, the blown-in foam insulation is thinner, because door compartment narrows. Because of thinner insulation, the exterior of the recess is colder than the rest of the exterior panel, causing a cold spot 215 where sweating or condensation can occur. The prior art remedy to this condensation is a small electronic heater (not shown) that warms the recess, preventing condensation. This remedy is undesirable for many reasons. There is a need for an insulation material 185 that is superior to an equivalent amount of blown-in polyurethane foam, that is thin and provides vertical insulation and lateral conductive properties. Preferably, the insulating material 185 will increase the temperature of the cold spot 215 by at least 3 degrees when compared to blown-in polyurethane foam. The present invention provides these properties.

Figure 2:
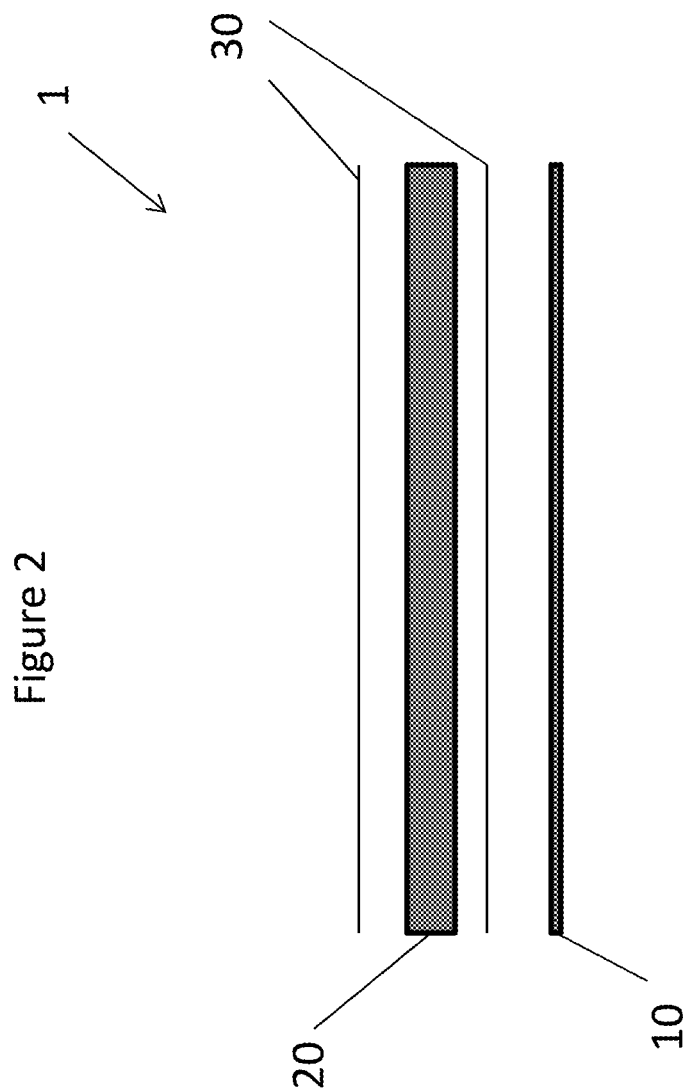
FIG. 2 is a cut-away view of an embodiment of the prior art tested as Control 1.
Figure 3:
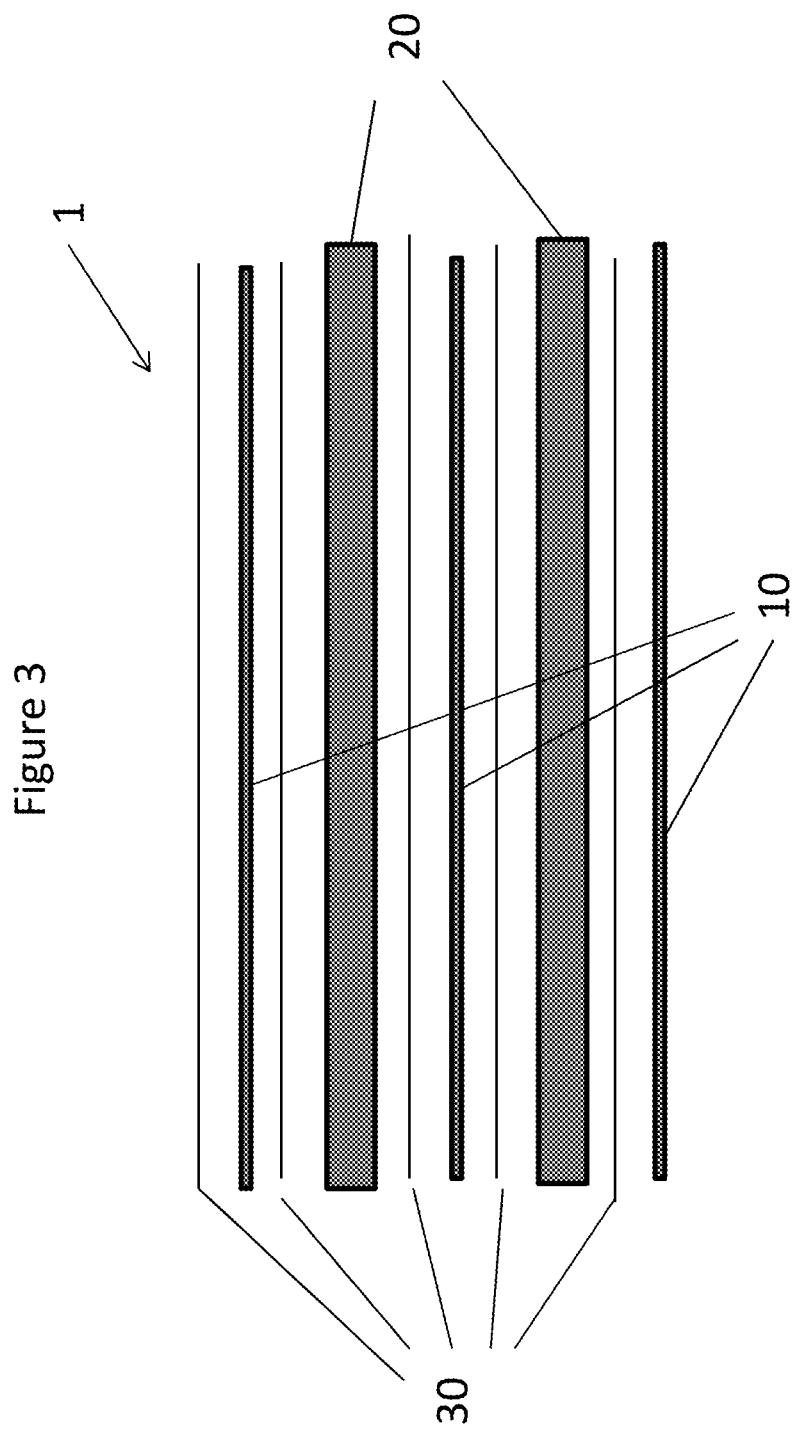
FIG. 3 is a cut-away view of an embodiment of an insulation material tested as Control 2.
Figure 4:
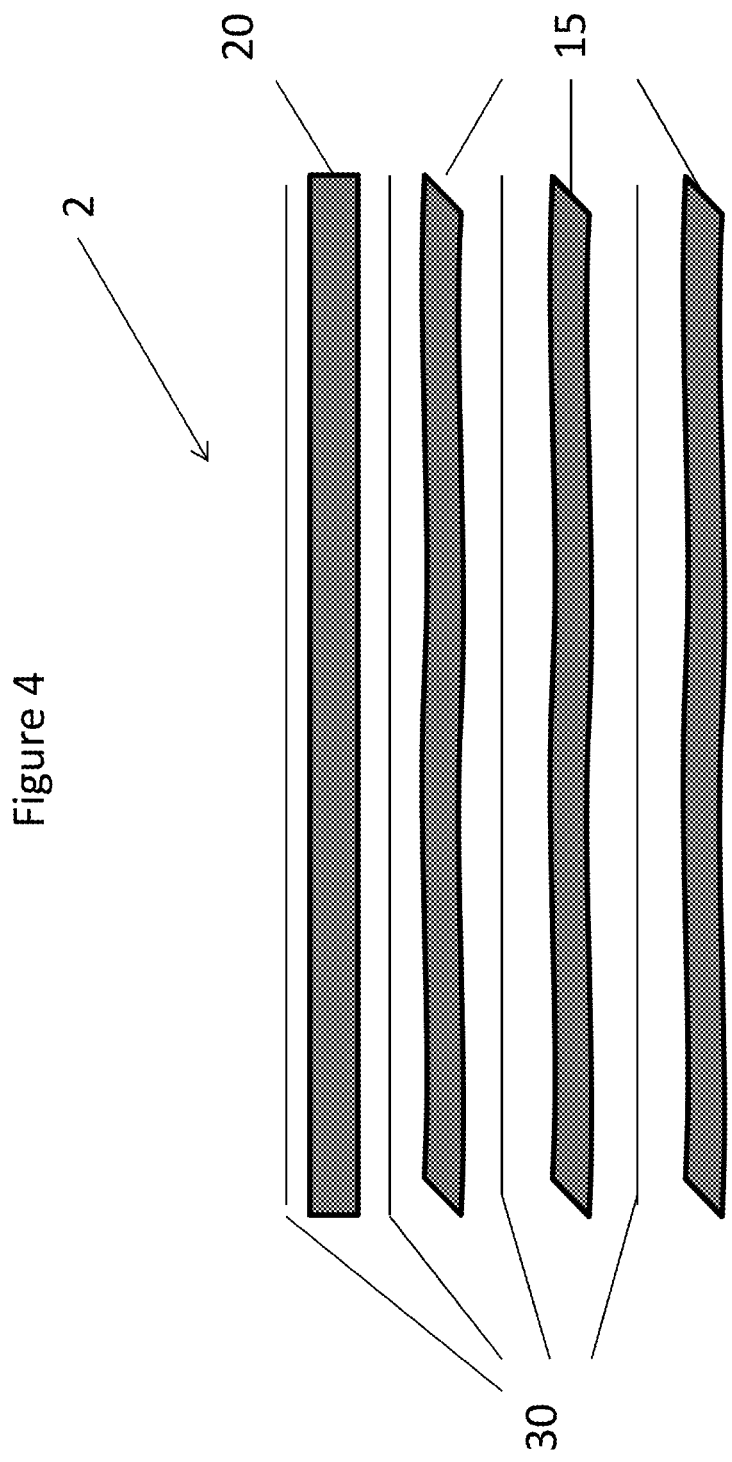
FIG. 4 is a cut-away view of an embodiment of an insulation material tested as Control 3.

FIG. 1, which is Example 1, illustrates this invention. FIG. 2, which is Control 1, is one layer of foil backed by one layer of insulation. FIGS. 3 and 4, Controls 2 and 3, are examples of insulating material that were ineffective in providing effective insulation when tested. FIGS. 1-4 are all cut-away views of the insulating material. The insulating material 1 has at least one layer of aluminum metal foil 10 and insulating foam 20. Although the preferred metal is aluminum, other metals with thermal conductivity properties, such as copper are suitable. Any type of formed insulating sheet foam is suitable. A preferred foam is closed cell polyethylene foam. Optionally the insulating material also has pressure sensitive adhesive material 30 between the layers, or on the bottom layer to adhere the material to device being insulated. Other types of adhesives are also suitable for this material. In FIG. 4, the aluminum foil 35 can be crinkled, or have an irregular surface to provide insulating material 2.

The insulating material of FIGS. 1-4 (Example 1 and Controls 1-3) was made of 0.002 inch thick aluminum foil separated by layers of 0.0625 inch thick closed cell polyethylene sheet foam. Between each layer was deposited 0.0065 inch acrylic pressure sensitive adhesive. Optionally, a peel-off cover (not shown) can be placed over the bottom layer of adhesive. The total thickness of the insulating material of FIG. 1 was about 0.25 inches. These materials were used in Test 1, below.

The preferred aluminum foil is from about 0.1 to 10 mil (0.0001 to 0.010 inch) thick. The more preferred thickness is from about 1 to 4 mil thick. This is much thinner than the foil used by the prior art, yet led to superior performance. As shown in FIG. 1, in a preferred embodiment, a first outerlayer 11 and second outerlayer 12 of the insulating material is aluminum foil. As shown in FIG. 7, the first aluminum foil outer layer contacts the exterior panel and the second aluminum foil outer layer contacts the interior panel. In a more preferred embodiment of the invention, the outer surface of the first outer layer 11 has a layer of adhesive applied to it to affix the insulating material to the exterior panel. The insulating foam can be any rigid or flexible insulating foam. The preferred insulating foam is flexible polyethylene foam, and the most preferred foam is closed cell polyethylene foam. The flexibility of the foam allows the insulating material to be molded to the desired shape of the surface, which is particularly desirable if the surface is not flat. If pressure sensitive adhesive is applied to an external surface of the material, the molded material can be positioned and adhered to the desired location. The thickness of the foam can be from about 0.01 to 1.0 inches thick. The preferred thickness of foam is from about 0.03 to 0.50 inches thick. The most preferred thickness is from about 0.03 to 0.10 inches thick.

The preferred total thickness of the insulating material is thin and is from about 0.1 inch to about 1.0 inches thick.

Test 1

Figure 5:
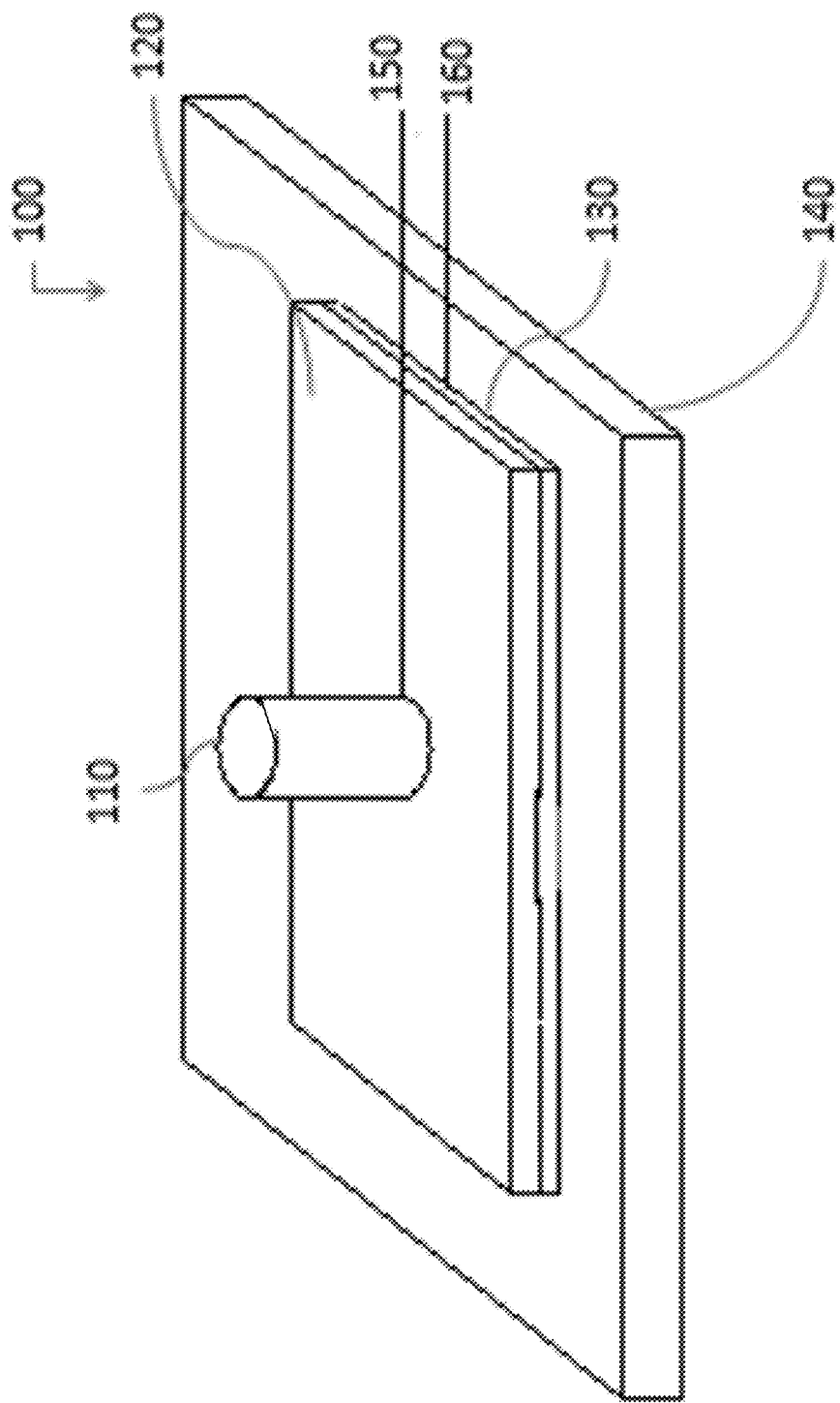
FIG. 5 is a perspective drawing of the test apparatus.

The insulating materials illustrated in FIG. 1 as Example 1 and FIGS. 2, 3 and 4 as Controls 1, 2 and 3 respectively, were tested using the test apparatus 100 disclosed in FIG. 5. The test apparatus 100 had a base 140 made of water-absorbent reticulated foam. This layer was used to absorb water from melting ice. Resting on the base was a plastic layer 130 used to support the insulating material 120. The plastic layer 130 was made of ABS polymer, to simulate the refrigerator handle, which was made of ABS polymer. Sandwiched between the base 140 and the plastic layer 130 was a warm-side thermocouple 160. Centered on top of the insulating material 120 was a block of ice 110. Sandwiched between the block of ice 110 and the insulating material 120 was a cold-side thermocouple 150. Data was taken measuring the cold-side temperatures and the warm-side temperatures versus time (minutes).

Control 4 was insulating foam without aluminum and was tested to compare to the data from Example 1. The typical material used to insulate refrigerator or freezer doors is blown-in closed cell polyurethane foam. Because the test apparatus 100 was not set up to contain blown-in foam, a second insulating foam was used: 2 pound polyethylene foam, with no aluminum layers. When this polyethylene foam compared to blown-in foam in an insulating test, it was found to have almost identical insulating properties, so it was a logical substitution for this comparison. A 0.375 inch thick sheet of the polyethylene foam was used in test apparatus 100 as the insulating material 120 for Control 4. Data was taken measuring the cold-side temperatures and the warm-side temperatures versus time.

The results of Test 1 are represented graphically in FIG. 6. As can been seen from FIG. 6, the cold-side temperature for Example 1 and Control 4 are very close together, about 1-2 degrees F., until the very end of the test where there is about a 4 degree F. spread for about 5 minutes, with Example 1 having the warmer temperature. For the warm-side temperatures, there is about an 8 degree spread from about 70 minutes to the end of the test at 238 minutes. Example 1 is consistently warmer than Control 4 after about 14 minutes, indicating the superior lateral conducting and vertical insulating properties of Example 1. At 180 minutes into the test, the warm-side temperatures were 50 degrees F. for Control 4 and 58 degrees F. for Example 1. The higher temperature for Example 1 (58 degrees F.) indicates a superior insulating material to that of Control 4 (50 degrees F.) by 8 degrees F. Additionally, this superior performance is provided by a thin insulating material less than ½ inch thick, i.e., about 0.25 inch thick.

Similar results from Test 1 were found for Example 1 and Controls 1-3. All four samples were sent to a refrigerator/freezer manufacturer for further testing.

Test 2

Test 2 was run by a refrigerator/freezer manufacturer who wanted to replace the heaters installed in the refrigerator door panel behind the recess for the handle with an improved insulating material that would prevent condensation due to cold spots. Four samples were submitted for testing: Example 1 and Controls 1-3. After being testing by the manufacturer, Example 1 was found to effectively eliminate the cold spot in the handle recess. Controls 1-3 failed to eliminate the cold spot.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

The invention claimed is:

1. A refrigerator or freezer door comprising an exterior panel and an interior panel forming an insulating chamber wherein the exterior panel has an exterior recess which causes a narrowing of the chamber;
   wherein the insulating chamber consists essentially of;
   a first thermal insulating material and a second thermal insulating material;
   wherein the first thermal insulating material consists essentially of alternating layers of aluminum foil and flexible insulating foam sheets;
   wherein the first insulating material is applied to the chamber directly behind the recess;
   wherein the alternating layers have a first outer layer and a second outer layer, wherein the outer layers are aluminum foil;
   wherein the first material is less than about ½ inch thick;
   wherein the first material has vertical thermal insulating properties,
   wherein the first material has lateral thermal conducting properties;
   wherein the first aluminum foil outer layer contacts the exterior panel and the second aluminum foil outer layer contacts the interior panel thereby extending the first insulating material across the full thickness of the recess;
   wherein the second thermal insulating material consists essentially of polyurethane foam;
   wherein the second thermal insulating material sandwiches the first thermal insulating material in a lateral direction and fills the rest of the insulating chamber; and
   wherein the second insulating material is not located behind the exterior panel recess.

2. The door of claim 1, wherein the material further comprises three or more layers of insulating foam and four or more layers of aluminum foil; and wherein the layers of aluminum foil are separated by the insulating foam sheets and the aluminum foil layers do not contact each other.

3. The door of claim 1, wherein the material further comprises three layers of insulating foam and four layers of aluminum, and between each layer of foam and aluminum is a layer of adhesive.

4. The door of claim 3, wherein the insulating foam is closed cell polyethylene and the aluminum is from 0.1 to 10 mil thick, and wherein the first aluminum foil outer layer has adhesive applied to its outer surface.

5. A method of insulating a refrigerator door having an interior panel and an exterior panel with an insulation chamber between the panels and an exterior recess in the exterior panel which causes a narrowing of the chamber and a cold spot on the exterior surface of the exterior panel comprising installing insulation in the insulating chamber;
   wherein the insulation consists of a first thermal insulating material and a second thermal insulating material;
   wherein the first thermal insulating material consists essentially of alternating layers of aluminum foil and flexible insulating foam sheets;
   wherein the first insulating material is applied to the chamber directly behind the recess;
   wherein the alternating layers have a first outer layer and a second outer layer, wherein the outer layers are aluminum foil;
   wherein the first material is less than about ½ inch thick;
   wherein the first material has vertical thermal insulating properties,
   wherein the first material has lateral thermal conducting properties;
   wherein the first aluminum foil outer layer contacts the exterior panel and the second aluminum foil outer layer contacts the interior panel thereby extending the first insulating material across the full thickness of the recess;
   wherein the second thermal insulating material consists essentially of polyurethane foam;
   wherein the second thermal insulating material sandwiches the first thermal insulating material in a lateral direction and fills the rest of the insulating chamber; and
   wherein the second insulating material is not located behind the exterior panel recess.

6. The method of claim 5, wherein there are three or more layers of insulating foam and four or more layers of aluminum foil; and wherein the layers of aluminum foil are separated by the insulating foam sheets and the aluminum foil layers do not contact each other.

7. The method of claim 5, wherein there are three or more layers of insulating foam and four or more layers of aluminum foil.

8. The method of claim 5, wherein there are three layers of insulating foam and four layers of aluminum.

9. The method of claim 8, wherein the insulating foam is closed cell polyethylene and the aluminum is from 1 to 10 mil thick, and at least one layer of aluminum is an outer layer.

10. The method of claim 9, wherein the outer surface of the first outer layer of aluminum has pressure sensitive adhesive applied to it.

11. The method of claim 10, wherein the material causes the cold spot to increase in temperature by at least 5 degrees when compared to blown-in polyurethane insulation.

12. The method of claim 11, wherein the material causes the cold spot to increase in temperature by at least 7 degrees when compared to blown-in polyurethane insulation.

\* \* \* \* \*